UNITED STATES PATENT OFFICE.

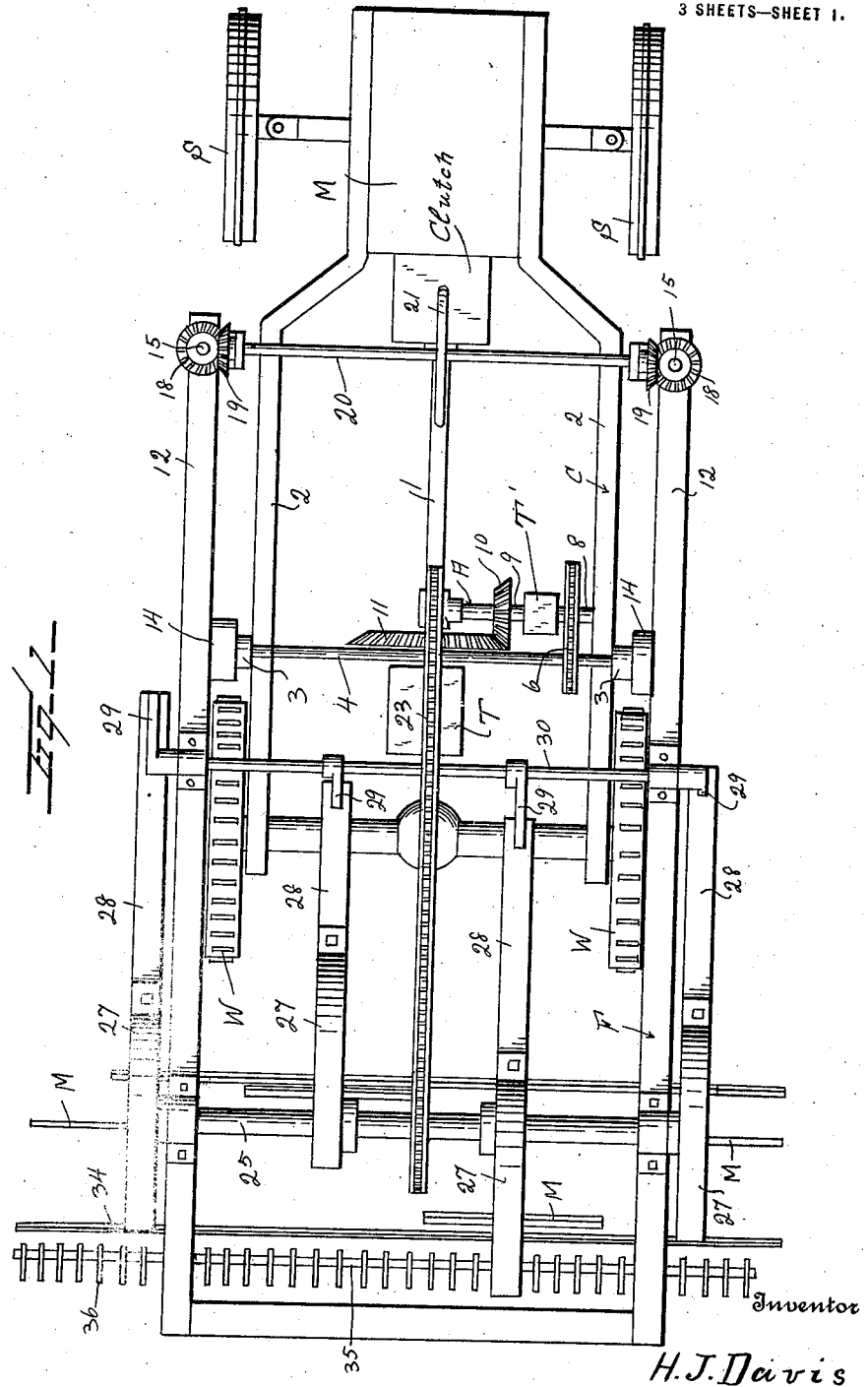

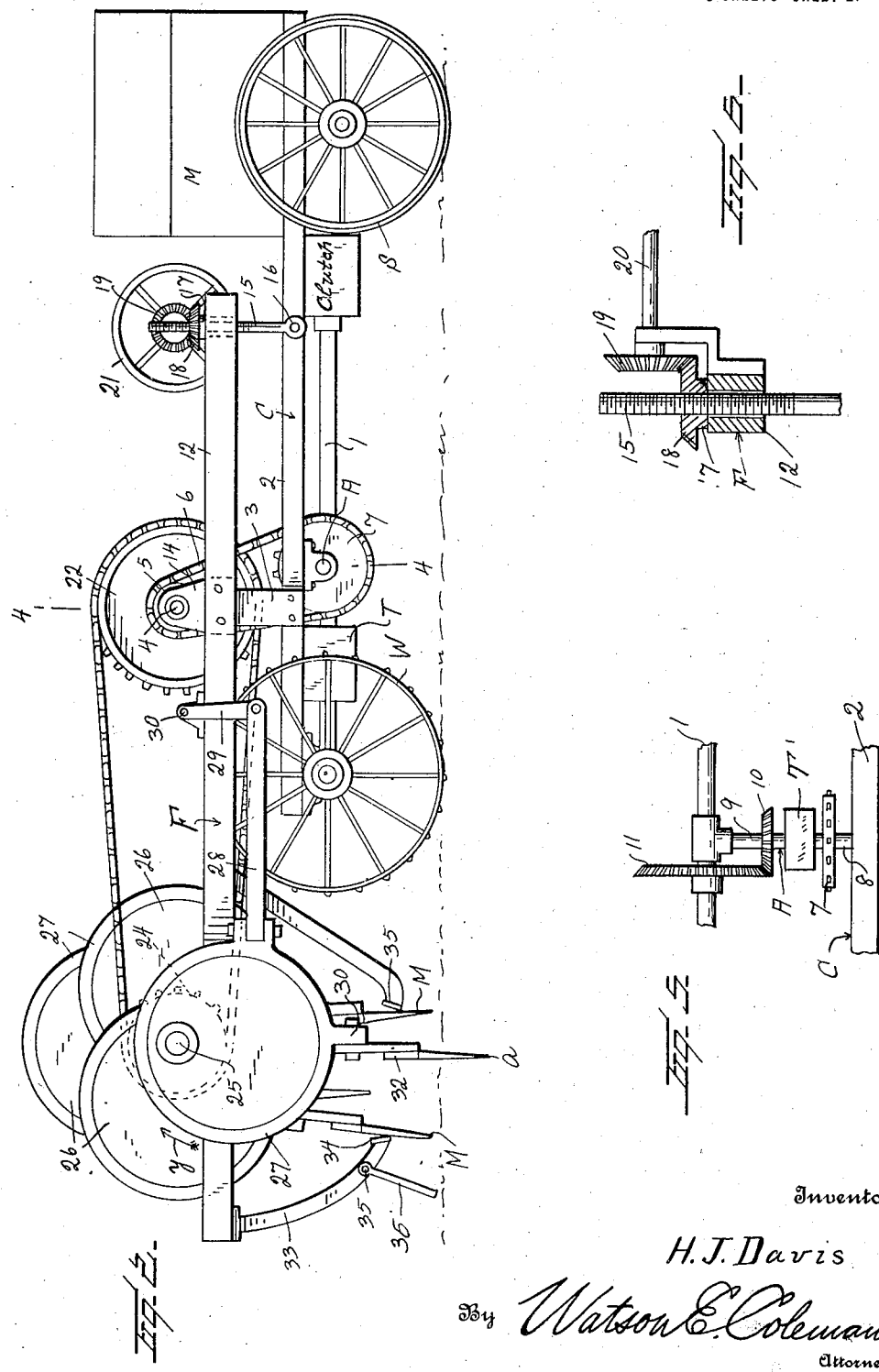

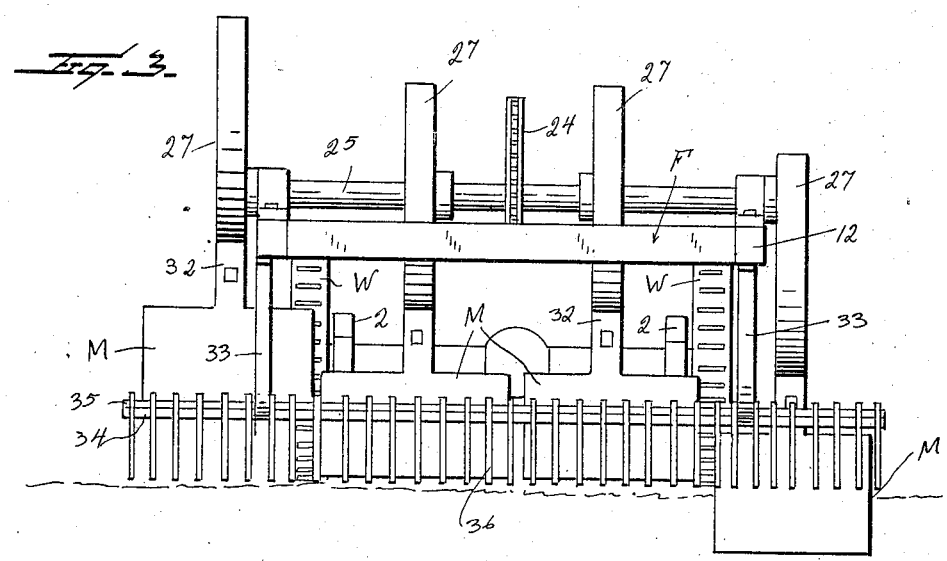
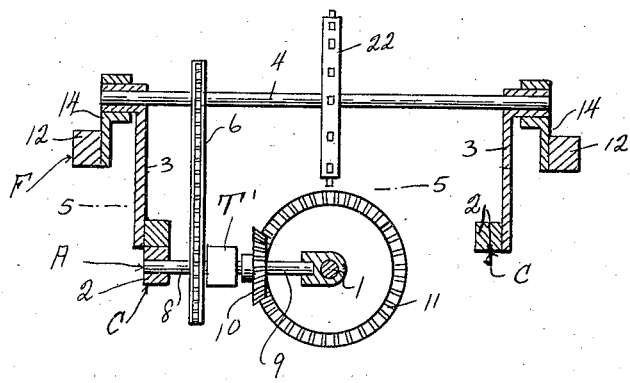

HENRY JEFFERSON DAVIS, OF WAYNESBORO, GEORGIA.

AGRICULTURAL MACHINE.

1,352,725.

Specification of Letters Patent. Patented Sept. 14, 1920.

Application filed April 14, 1919. Serial No. 289,802.

*To all whom it may concern:*

Be it known that I, HENRY JEFFERSON DAVIS, a citizen of the United States, residing at Waynesboro, in the county of Burke and State of Georgia, have invented certain new and useful Improvements in Agricultural Machines, of which the following is a specification, reference being had to the accompanying drawings.

This invention relates to certain improvements in agricultural machines and has relation more particularly to a device of this general character which is power driven, and it is an object of the invention to provide a novel and improved machine of this general character whereby the action of the ground working member or members upon the ground or soil also affords means for driving the machine in addition to the motor carried thereby.

It is also an object of the invention to provide a novel and improved machine of this general character comprising a ground working member traveling in a vertically disposed orbit, together with means whereby the rate of travel of said ground engaging member in its orbit may be increased or decreased in accordance with the requirements of practice.

Another object of the invention is to provide a novel and improved device of this general character wherein a gang of ground working members are employed and which travel in their several orbits and are so related that said ground engaging members engage and work the ground or soil in sequence.

An additional object of the invention is to provide a novel and improved device of this general character wherein a vertically adjustable or swinging frame is employed and which frame is provided with one or more ground working members traveling in a vertical direction and wherein the adjustment of the frame regulates the depth of penetration of the ground working member or members.

It is a particular object of my invention to provide a novel and improved machine of this general character including a variable driving means for the machine, together with variable driving means for the ground engaging means, so that the rate of travel of the machine may be regulated independently of the operation of the ground working means and vice versa, so that the working of the ground or soil may be accomplished in a manner which best meets the requirements of practice.

A still further object of the invention is to provide a novel and improved device of this general character including a ground working member traveling in a vertically disposed orbit, together with means with which said ground working member coacts for cleaning said member during its travel free of the ground, together with a fender positioned rearwardly of the ground working member to prevent indiscriminate throwing of the loosened ground and which fender also operates to break any clods or the like which may be thrown off during the action of the ground working member.

The invention consists in the details of construction and in the combination and arrangement of the several parts of my improved agricultural machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of an agricultural machine constructed in accordance with an embodiment of my invention.

Fig. 2 is a view in side elevation of the machine as herein disclosed.

Fig. 3 is a view in rear elevation of the machine as disclosed in Figs. 1 and 2.

Fig. 4 is a fragmentary vertical sectional view illustrating certain details of the driving means as herein included.

Fig. 5 is an enlarged sectional view taken substantially on the line 5—5 of Fig. 4, and Fig. 6 is a fragmentary view partly in elevation and partly in section illustrating one of the adjusting means for the swinging frame as herein included.

As disclosed in the accompanying drawings, C denotes a chassis or frame of any ordinary or preferred type and which is supported at its rear portion by the driving wheels W and at its forward end portion by the steering wheels S. The driving wheels W are driven in a well known manner through the instrumentality of the transmission or propeller shaft 1 and which shaft 1 is operated by the motor M preferably of an internal combustion type.

Coacting with the shaft 1 is a transmission T of any ordinary or preferred construction and whereby the shaft 1 may be caused to rotate at different speeds so that the travel of the machine may be readily regulated in accordance with the occasions of practice.

It is to be understood that a suitable steering mechanism coacts with the wheels S but as this mechanism forms no part of the present invention, an illustration and description thereof is believed to be unnecessary.

Extending upwardly from the side members 2 of the chassis or frame C at a point inwardly of the wheels W are the transversely alined standards or columns 3 which rotatably support at their upper end portions the transversely disposed shaft 4. Fixed to the shaft 4 is a sprocket wheel 5 around which is directed a chain 6 which is also directed around a sprocket 7. The sprocket 7 is fixed to a countershaft A suitably supported by the chassis or frame C and said shaft A comprises two alining sections 8 and 9 operatively connected through the medium of the transmission T', whereby the section 8 may be caused to rotate at different speeds for a purpose to be hereinafter more particularly referred to.

The section 9 of the shaft A is driven from the transmission or propeller shaft 1 and, as is herein disclosed, the connection therebetween is obtained through the medium of the meshing gears 10 and 11, the gear 10 being fixed to the section 9 of the shaft A and the gear 11 being fixed to the transmission or propeller shaft 1.

F denotes a supplemental frame positioned above the chassis or frame C and extending rearwardly thereof and the side members 12 at a desired distance inwardly of the forward ends thereof are provided with the upstanding brackets 14 having their upper end portions engaged for swinging movement with the upper end portions of the standards or columns 3 so that the desired vertical swinging movement of the frame F may be readily obtained.

The forward end portions of the side members 12 of the frame F have loosely disposed therethrough the upstanding threaded shanks 15 each pivotally supported at its lower end, as at 16, with a side member 2 of the frame or chassis C.

In threaded engagement with the shanks 15 above the frame F are the collars 17 each including a bevel gear 18 meshing with a gear 19 fixed to an end portion of a transversely disposed shaft 20 carried by the frame F. The shaft 20 substantially midway its length has fixed thereto an operating wheel 21 or the like whereby requisite rotation may be imparted to the shaft for causing each of the collars 17 to move upwardly or downwardly relative to its shank 15. Downward movement of the collars 17 results in upward or rising movement of the rear portion of the frame F while said rear portion of the frame F will drop or lower by gravity upon movement of the collars 17 upwardly of their shanks 15. This vertical swinging movement or adjustment of the frame F regulates the extent of penetration of the ground working members to be hereinafter more particularly referred to and also permits an adjustment of the frame F to maintain said ground working members entirely free of the ground or soil should the requirements of practice so necessitate.

Fixed to the shaft 4 substantially midway between the side members 2 of the chassis or frame C and the side members 12 of the frame F is a sprocket wheel 22 around which is directed a chain 23. The chain 23 is also directed around a sprocket wheel 24 fixed to a transversely disposed shaft 25 rotatably supported by the rear portion of the frame F and at a point rearwardly of the chassis or frame C and the rear supporting wheels W. Fixed to the shaft 25 is a plurality of eccentrics 26 preferably equidistantly spaced and in staggered relation and in a manner which best meets the requirements of practice.

Each of the eccentrics 26 coacts with a surrounding strap 27 and the forward portion of said strap has engaged therewith an end portion of a forwardly directed pitman 28 of desired length. The forward end portion of the pitman 28 is pivotally engaged with a rock arm or lever 29 depending from and loosely engaged with a transversely disposed rod or stationary shaft 30 supported by the frame F. The pitman 28 serves to hold the strap 27 against rotation while its connection with the arm 29 permits the desired travel of said strap 27 in its vertical orbit.

The lower portion of each of the straps 27 has depending therefrom an arm or lug 31 to which is secured a ground working member M or more particularly an upstanding shank 32 thereof.

In the present embodiment of my invention, each of the ground working members M is substantially rectangular in form, with its flat faces vertically disposed and with its lower margin formed into a cutting or knife edge $a$ so that the requisite penetration of the ground or soil is facilitated. Each of the members M is also of a length so that the ends of adjacent members closely approach, whereby working or cutting of the ground or soil by the members M is substantially continuous in the direction transversely of the machine, while the speed of rotation of the eccentrics 26 is such as to cause the cutting or working of the ground or soil substantially continuous in the direction of travel of the machine.

In practice, it is to be understood that the shaft 25 rotates at a speed whereby the peripheral rotation of the eccentrics 26 is materially in excess of the peripheral rotation of the wheels W, so that the desired cutting or working of the ground or soil is assured. It will also be understood that the straps 27 travel in the direction generally indicated by the arrow $y$ in Fig. 2 so that the action of the cutting members M upon the ground or soil also assists in the propulsion of the machine.

The transmission T' permits a variation in the travel of the straps 27 independently of any variation in the travel of the machine through the medium of the transmission or propeller shaft 1. By this means, the spaces between the bites of each of the ground working members M may be regulated because the faster the straps 27 travel, the less distance between the bights of the members M and vice versa. The distance between the bites of the members M may be further regulated by reducing or increasing the rate of travel of the machine through the instrumentality of the transmission T so that in practice the regulation afforded by the transmission T and the transmission T' constitutes an important feature of my invention as herein embodied.

Depending from the side members 12 of the frame F at opposite sides of the shaft 25 are the brackets 33 of a length to closely approach the ground line and the lower end portions of the brackets 33 support the horizontally disposed members 34 with which the ground working members are adapted to engage in their upward and downward movements so that the members 34 operate to effectually clean said members M from dirt or the like adhering thereto.

The rear brackets 33 also support a head bar 35 from which depend the spaced fingers 36. Adjacent fingers 36 are arranged in close proximity so that an effective fender is provided to prevent the indiscriminate scattering of soil loosened by the ground working members and which fender also affords means whereby clods of earth thrown up by the members M are effectively broken or substantially pulverized.

As is clearly illustrated in Fig. 1, the frame F is of a width in excess of the chassis or frame C so that the ground working members will extend beyond opposite sides of the chassis or frame C so that the supporting wheels W and S, during a working operation, will travel on unbroken ground.

While I have hereinbefore described my invention as particularly adapted for use as an agricultural machine, it is also to be understood that it can be employed with equal facility as a road making or road grading machine. It is also to be particularly emphasized that a machine constructed in accordance with my present invention operates with greater speed and with less power than is required by machines for similar purposes and now in use.

From the foregoing description, it is thought to be obvious that an agricultural machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An agricultural machine of the class described comprising, in combination, a portable structure including a driving shaft, a ground working member supported for movement independently of the travel of the structure means driven from the shaft for imparting movement to the ground working member and means for regulating said last named means to vary the speed of the ground working member, said last means operating independently of the shaft.

2. An agricultural machine of the class described comprising, in combination, a portable structure, a motor for driving said structure at variable speeds, a ground working member traveling in an orbit, means driven from the motor for moving the ground working member in its orbit, and means for regulating said last named means to vary the speed of the ground working member in its orbit, said last named means operating independently of the speed of travel of the structure.

3. An agricultural machine of the class described comprising a portable structure, an eccentric supported by the structure, means for rotating said eccentric at variable speeds, a strap surrounding said eccentric, a ground working member carried by said strap and movable therewith, and means connected directly with the strap for holding the same against rotation about its center.

4. An agricultural machine of the class described comprising, in combination, a portable structure including a driving shaft, a ground working member traveling in an orbit, means driven from the shaft for moving the ground working member in its orbit, and means for regulating said last named means to vary the speed of the ground working member in its orbit, said last named means operating independently of the shaft.

5. An agricultural machine of the class described comprising, in combination, a portable structure including a driving shaft, a ground working member traveling in substantially a vertical orbit, means driven from the shaft for moving the ground working member in its orbit, and means for regulating said last named means to vary the speed of the ground working member in its orbit, said last named means operating independently of the shaft, said ground working member being carried by and depending from the lower portion of the strap.

In testimony whereof I hereunto affix my signature in the presence of a witness.

HENRY JEFFERSON DAVIS.

Witness:
 ROBERT A. BOSWELL.